W. Johnson.
Turning Lathe
N°. 65,089.  Patented May 28, 1867.
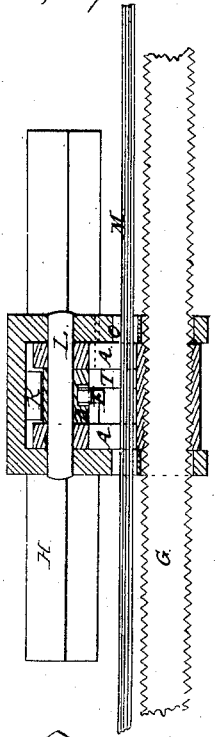
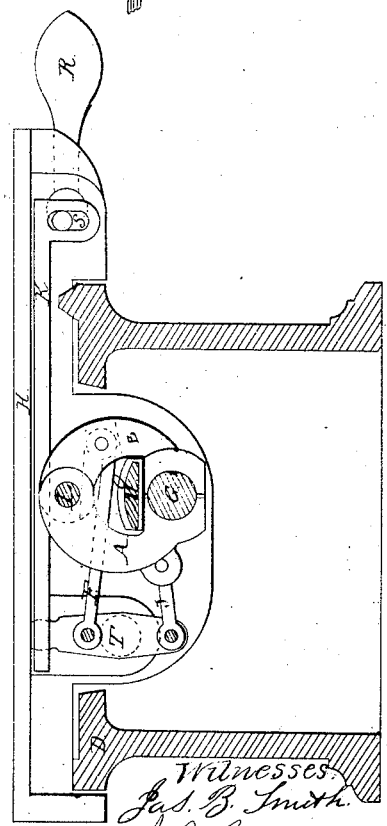
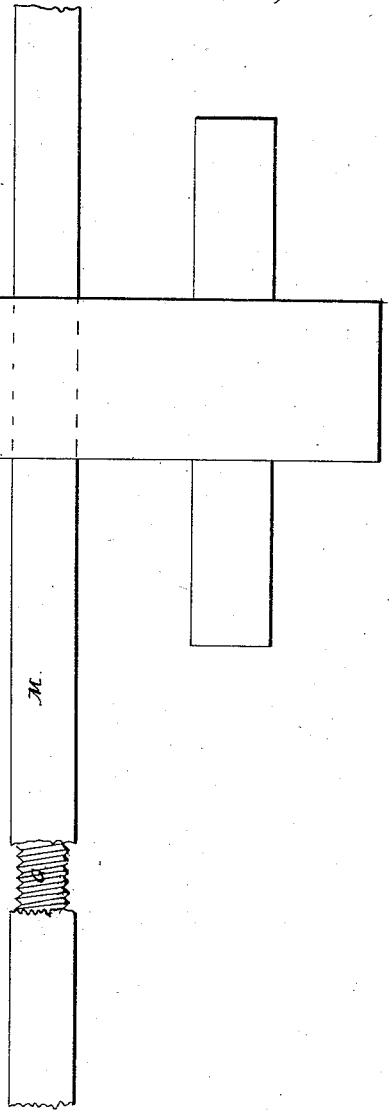
Witnesses:
Jas. B. Smith
J. B. Gage
Inventor:
William Johnson

United States Patent Office.

WILLIAM JOHNSON, OF LAMBERTVILLE, NEW JERSEY.

Letters Patent No. 65,089, dated May 28, 1867.

---

IMPROVEMENT IN TURNING-LATHES.

---

*The Schedule referred to in these Letters Patent and making part of the same.*

---

TO ALL WHOM IT MAY CONCERN:

Be it known that I, WILLIAM JOHNSON, of the town of Lambertville, in the county of Hunterdon, and State of New Jersey, have invented a new and useful Improvement in Engine-Lathes, (commonly called slide-lathes;) and I do hereby declare that the following is a full and exact description thereof, reference being had to the accompanying drawings and to the letters of reference marked thereon.

My improvement relates to lathes having their feed-screw placed near the centre between the sides of the bed; and consists briefly in forming an aperture in the sides of the slide-rest directly over the screw, through which aperture a light cover of metal is inserted. Said cover is stationary, being secured at its ends to the bed, while the slide-rest passes over it freely, by which means a continuous cover is formed, affording full protection to the screw from chips and dirt, or being otherwise injured, whereas, heretofore, only short covers attached to the slide-rest and moving therewith, and affording but partial protection to the screw, have been used. Furthermore, in the peculiar form of the nuts and arrangement for opening and closing the same upon the screw.

Figure 1 is a side view of the slide-rest, having one side removed, in which all the parts are clearly shown.

Figure 2 is a transverse section of the same, through the centre of screw G and pin L.

Figure 3 is a plan or top view of slide-rest and cover, with a portion of the cover broken out, exposing the screw—

The several letters in all the figures referring to the same parts.

H is the slide-rest, shown in its usual position upon bed D; G is the feed-screw, communicating motion to the slide-rest; M is the cover passing through the slide-rest and secured to the bed, extending the entire length of the screw, or so far as to prevent its thread from being injured; O is an aperture in the sides of the slide-rest, through which the cover M is inserted, made of sufficient size to permit the slide-rest to traverse the cover freely; A and B are half nuts, having threads corresponding to those of the screw, and so made as to permit the passage of the cover between them; L is a pin supporting the nuts, and by which they are hinged together; S is an eccentric, having its bearing in the side of the rest, with a handle, R, fastened upon its outer end; K is a connecting-bar, with a slot at one end, through which passes the eccentric pin; T is a movable arm, having its bearing in the side of the rest, shown by dotted lines, one end of which passes through bar K, and is moved thereby; F and J are connecting-rods attached to movable arm K, at unequal distances from its centre of motion, and also to the nuts A and B, at unequal distances from their centre of motion, so corresponding one with the other as to produce an equal movement to the nuts in opening and closing them upon the screw, which is done by simply moving the handle R a short distance, the operation and arrangement of which are so clearly shown in the drawing as to be unmistakable.

What I claim as my invention, and desire to secure by Letters Patent is—

1. The continuous cover M, over the feed-screw G, said cover passing through an aperture in the slide-rest, and in other respects arranged as set forth.

2. Constructing the feed-nuts to allow the cover to pass between them; and the peculiar arrangement of eccentric movable arm and connecting-bars, whereby the feed-nuts are made to move equal distances in opening and closing upon the feed-screw, by rods attached to said nuts at points unequally distant from their centre of motion. The whole combined and operating substantially as herein set forth and described.

WM. JOHNSON.

Witnesses:
  T. ABBOTT,
  C. S. REYNOLDS.